Jan. 5, 1971 E. P. SIMONEAU ET AL 3,553,683

BIPOLAR PATTERN SENSING SHAFT ENCODER

Filed July 27, 1967 3 Sheets-Sheet 1

INVENTORS
Earl P. Simoneau
George Manos
BY
Shenier & O'Connor
ATTORNEYS

BIPOLAR PATTERN SENSING SHAFT ENCODER

Filed July 27, 1967 3 Sheets-Sheet 2

INVENTORS
Earl P. Simoneau
George Manos
BY
Shenier & O'Connor
ATTORNEYS

INVENTOR.
Earl P. Simoneau
George Manos
BY
Shenier & O'Connor
ATTORNEYS

United States Patent Office 3,553,683
Patented Jan. 5, 1971

3,553,683

BIPOLAR PATTERN SENSING SHAFT ENCODER

Earl P. Simoneau, Trumbull, and George Manos, Norwalk, Conn., assignors to United Aircraft Corporation, East Hartford, Conn., a corporation of Delaware Filed July 27, 1967, Ser. No. 656,378
Int. Cl. G08c 9/08
U.S. Cl. 340—347 24 Claims

ABSTRACT OF THE DISCLOSURE

A bipolar pattern sensing shaft encoder in which the least significant output controls the polarity of switching segments located at transfer points in rows of greater significance to synchronize the more significant outputs with the least significant output.

BACKGROUND OF THE INVENTION

There are known in the prior art shaft position encoders or analog-to-digital converters in which brushes physically engage rows or concentric circles of conducting elements separated by nonconductive spaces on an insulating member. The most serious problem existing in converters of this type is the limitation on their useful life which is imposed by noise resulting from the physical contact. Generally the contact resistance which causes the noise is very low when the contacts are new. After a period of time in use, however, wear causes the noise to vary from a low value toward infinity. This may occur after from about 1 to $10\times10^6$ traverses.

It has been suggested in the prior art that the problem of noise be substantially eliminated by the provision of a bipolar encoder wherein signals of opposite polarities are applied to the segments to actuate output devices, the output of which will only change in response to a change in polarity of the input signal. By use of this technique, the useful life of the encoder may be lengthened to as many as 50 to $100\times10^6$ traverses between the brushes and the disc.

More particularly in the prior art, the copending application of John A. Kristy and Robert D. Rinehart, Ser. No. 528,428, filed Feb. 18, 1966, now Pat. No. 3,471,850, discloses a bipolar encoder in which potentials of opposite polarity are applied to alternate segments of a number of respective rows of segments corresponding to the number of significant places. Slip rings are employed to apply the signals to the segments. The brushes associated with each row actuate output circuits which change their condition only in response to a change in polarity at the input terminal. While the encoder shown in this copending application successfully utilizes the bipolar principle to overcome the effect of contact noise, it requires an inordinate amount of auxiliary output logic circuitry to ensure that outputs in places of more significance are synchronized with the least significant output. Owing to the necessity for employing so much auxiliary circuitry the converter is larger than is an equivalent encoder which is not bipolar in nature.

We have invented a bipolar encoder which substantially eliminates the effect of contact noise on the encoder output. Our encoder does not require appreciably more output logic circuitry than does an equivalent encoder which is not bipolar in nature. Our encoder may be used at higher speed than can the usual contacting encoder of the prior art. It has a substantially longer service life than does the usual contacting encoder of the prior art. It is no larger than are self-selecting encoders of the prior art.

SUMMARY OF THE INVENTION

One object of our invention is to provide a bipolar encoder which overcomes the disadvantages of encoders of the prior art.

Another object of our invention is to provide a shaft position encoder which may be operated at higher speeds which has a longer service life than do contacting encoders of the prior art.

A further object of our invention is to provide shaft position encoder wherein the effect of contact noise on the output is substantially eliminated.

Still another object of our invention is to provide a shaft position encoder of the bipolar type which is no larger than are self-selecting encoders of the prior art.

A still further object of our invention is to provide a bipolar encoder which does not require an inordinate amount of external logic circuitry.

Other and further objects of our invention will appear from the following description.

In general our invention contemplates the provision of an encoder of the bipolar type in which we interpose switching segments between segments of opposite polarity in rows of greater significance at loactions at which the corresponding output is to change. We control the polarity of the switching segments in response to the least significant row brush polarity.

BRIEF DESCRIPTION OF THE DRAWINGS

In the accompanying drawings which form part of the instant specification and which are to be read in conjunction therewith and in which like reference numerals are used to indicate like parts in the various views.

DESCRIPTION OF THE PREFERRED EMBODIMENTS

Figure 1:
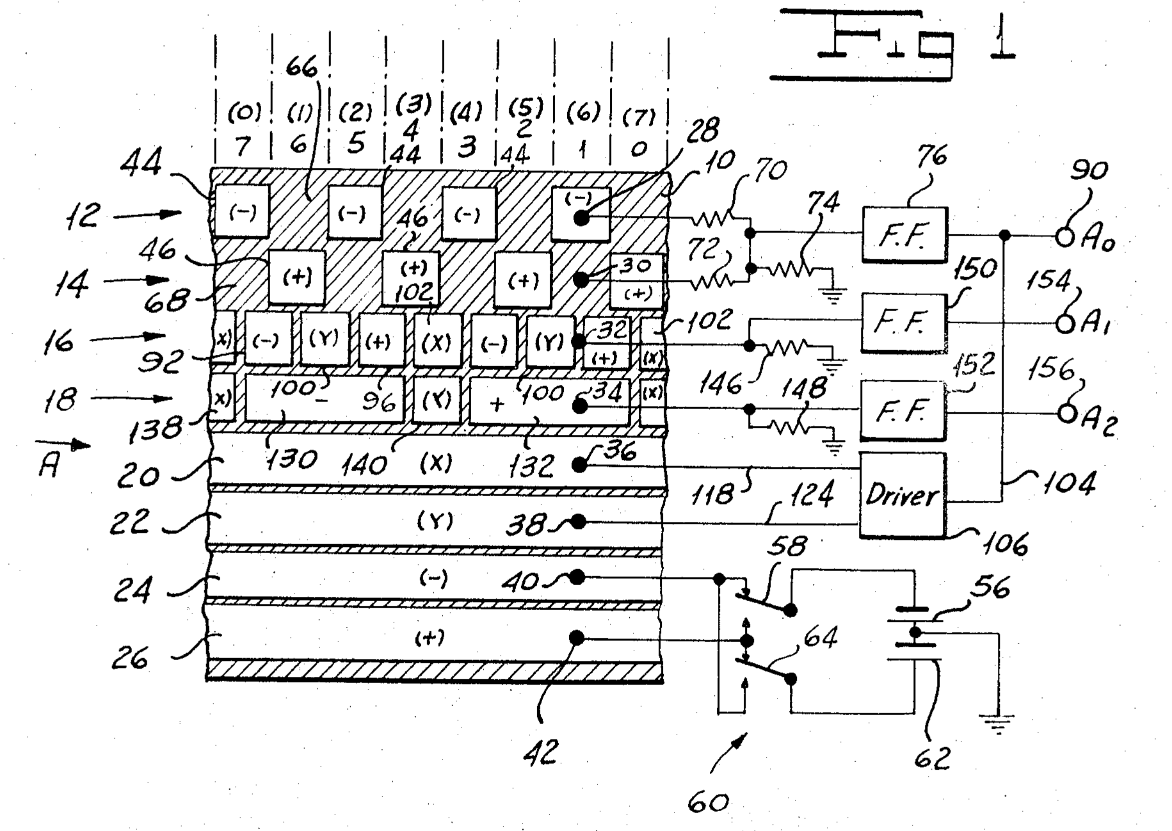
FIG. 1 is a schematic view of one form of our bipolar encoder showing the face of the coded disc.
Figure 2:
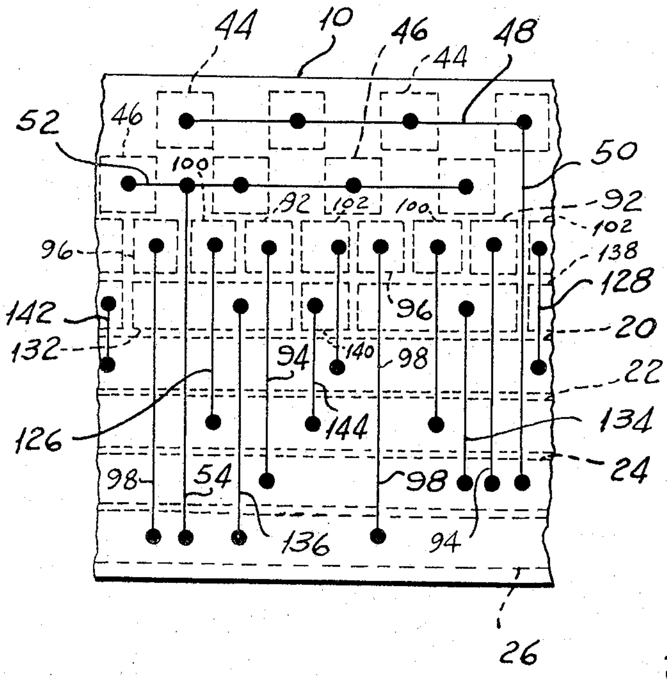
FIG. 2 is a schematic view of our bipolar encoder showing the segment connections thereof.

Referring now to FIGS. 1 and 2 of the drawings, the form of our encoder shown therein includes a body 10 carrying a plurality of rows indicated generally by the reference characters 12, 14, 16 and 18 of conductive segments. The body 10 is formed of an insulating material which isolates all the segments at the surface thereof. In addition to the rows of segments, body 10 carries a plurality of respective slip rings 20, 22, 24 and 26. We provide the encoder with a plurality of brushes 28, 30, 32, 34, 36, 38, 40 and 42 adapted, respectively, to engage the segments of rows 12, 14, 16 and 18 and slip rings 20, 22, 24 and 26.

In the arrangement illustrated in FIGS. 1 and 2, we apply a signal of one polarity to all of the segments 44 of row 12. We apply a signal of the opposite polarity to all of the segments 46 of row 14. This is achieved by connecting all of the segments 44 to the slip ring 24 and by connecting all of the segments 46 to the slip ring 26. This interconnection, as well as other connections to be described hereinafter, in the body 10 may be achieved in any suitable manner. For example, the connections may be made by means of relatively insulated conductive layers in the body 10, one of which makes the first connection between segments 44 and ring 24 and the other one of which makes the second connection between segmets 46 and slip ring 26. By way of illustration we have schematically indicated the connection between segments 44 and slip ring 24 by a common conductor 48 connecting all the segments and a conductor 50 leading from the common conductor to the slip ring 24. Moreover, the connection between the segments 46 and slip ring 26 is completed by conductors 52 and 54.

One arm 58 of a reversing switch, indicated generally by the reference character 60, connects the negative terminal of a first battery or other potential source 56 to brush 40. A second arm 64 of the reversing switch 60 connects the positive terminal of a source to the brush 42. In this way we apply a negative potential to ring 24 and thus to segments 44 and we apply a positive potential to the ring 26 and thence to the segments 46. Switch 60 may be operated, as will be described hereinafter, to reverse the manner of applying the potentials.

As is known in the art, in operation of an encoder of the contacting type, the body 10 moves relative to the brushes. In response to this relative movement, brush 28 alternately engages a segment 44 carrying a negative potential and an insulating space 66 having a width which is substantially the same as the segment width. Brush 30 engages an insulating space 68 while brush 28 is on a segment 44 and then engages a segment 46 carrying a positive potential when the brush 28 is on a space 66. Isolating resistors 70 and 72 connect the respective brushes 28 and 30 to an output resistor 74. Thus, in response to relative movement between body 10 and the brushes 28 and 30, resistor 74 alternately carries a positive potential and a negative potential, which potentials may have, for example, 20 volts.

We apply the potential on resistor 74 to an output and driving circuit 76 to be described more fully hereinafter. In response to the presence of a negative potential at its input terminal, circuit 76 provides a positive output signal. This positive output signal will be maintained until the application of a positive potential to the input terminal of the circuit.

Figure 4:
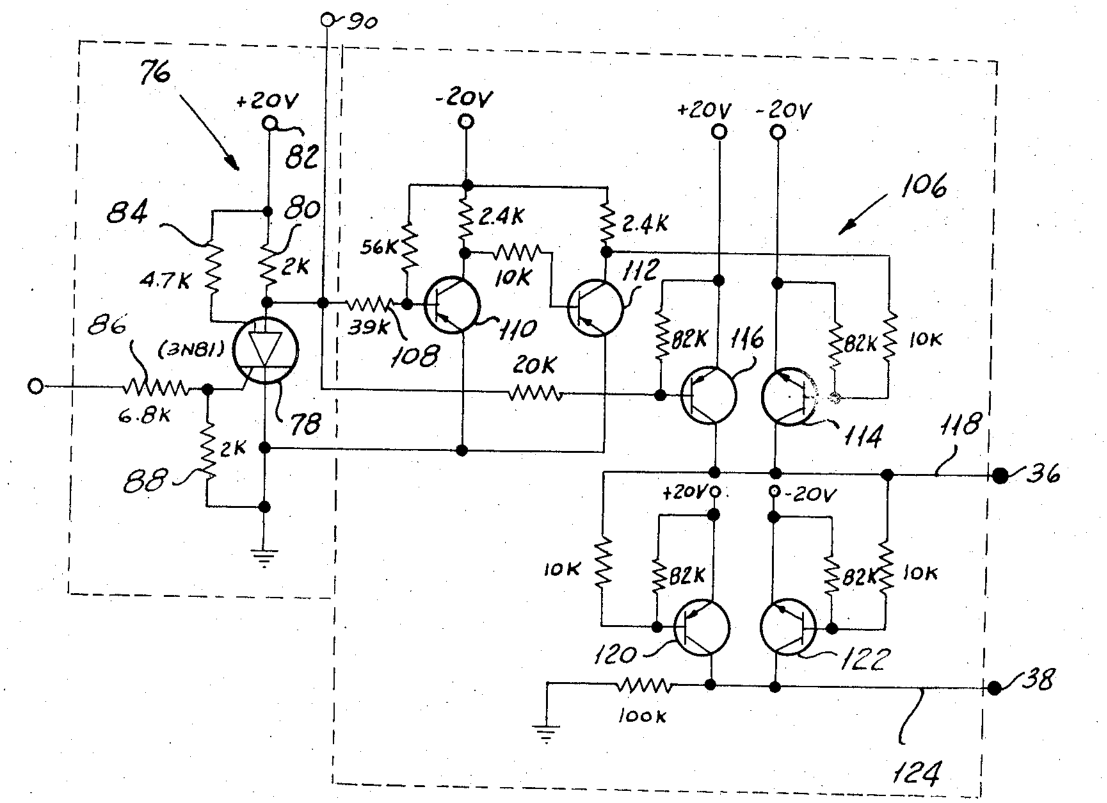
FIG. 4 is a schematic view illustrating one form of output and driving circuit which we may employ.

Referring to FIG. 4, one form of flip-flop circuit 76 which we may employ, and which is indicated generally by the reference character 76 in FIG. 4, includes a four-layer device 78 having its anode connected by a load resistor 80 to a positive potential terminal 82. Its cathode is connected to ground. A resistor 84 connects the anode gate of the device to terminal 82. Voltage dividing resistors 86 and 88 apply the potential at brushes 28 and 30, indicated as appearing across resistor 74 in FIG. 1, to the cathode gate of the device 78. In response to the presence of a positive potential, device 78 conducts heavily and the potential at the anode drops to ground. In response to a negative potential, conduction stops and the potential of the anode rises to that at terminal 82. This is the least significant output signal of our encoder which appears at terminal 90.

Referring again to FIGS. 1 and 2, row 16 includes segments 92 which are connected to the negative potential source 56 through slip ring 24 and brush 40. We have indicated the connection between the slip ring 24 and segments 92 by conductors 94 in FIG. 2. Row 16 also includes segments 96 disposed between adjacent segments 92. We have schematically indicated the connection between segments 96 and positive slip ring 26 by conductors 98 in FIG. 2. Normally each of the segments 92 and 96 would be approximately twice the width of a segment 44 or 46. In such an arrangement, however, as has been pointed out hereinabove, it is necessary to employ an inordinate amount of logic circuitry to synchronize the outputs of greater significance with the least significant output. In our arrangement we dispose first switching segments 100 between the segments of every other pair of adjacent segments 92 and 96. We dispose second switching segments 102 between the segments of the other pairs of adjacent segments 92 and 96. Moreover we control the polarities of segments 100 and 102 in response to the least significant output, thus to synchronize the output of row 16 with the least significant output. A conductor 104 applies the least significant output to a driver circuit 106 which provides respective outputs for brushes 36 and 38. The character of circuit 106 is such that with the potential on conductor 104 positive, it provides a positive signal for brush 36 and a negative signal for brush 38. When the potential on conductor 104 drops to ground, the polarities of the brushes reverse.

Referring again to FIG. 4, we have indicated one form of driver circuit 106 generally by the reference character 106. An input resistor 108 applies the potential on conductor 104 to a first transistor 110. When the potential at terminal 90 is at ground, transistor 110 conducts. When this occurs, the base of a transistor 112 rises to cut this transistor off. We apply the collector potential of transistor 112 to the base of a transistor 114. With transistor 112 cut off, its collector approaches a −20 volt potential to cut off transistor 114. The potential at terminal 90 also is applied to the base of a transistor 116 with the result that if terminal 90 is at ground potential, transistor 116 conducts. Under the conditions just described, the potential of a first output conductor 118 of the circuit 106 is at 20 volts positive. We apply this potential to the bases of respective transistors 120 and 122 in response to which transistor 120 is cut off and transistor 122 conducts to place a second output conductor 124 of circuit 126 at a −20 volt potential. When the potential on terminal 90 rises to +20 volts, the conditions of all the transistors 110, 112, 114, 116, 120 and 122 change with the result that conductor 118 is at a negative 20-volt potential while conductor 124 is at a positive 20-volt potential.

Referring again to FIG. 1, we connect the conductors 18 and 124 respectively to brushes 36 to 38. Each time the output at terminal 90 representing the least significant output changes from one condition to the other, the polarities of the two conductors 118 and 124 change. We connect the switching segments 100 of the row 16 to the slip ring 22 by connections indicated schematically by conductors 126 in FIG. 2. Similarly, the switching segments 102 of the row 16 are connected to slip ring 20 by connections indicated as conductors 128 in FIG. 2. Under these conditions, the polarities of the switching segments 100 and 102 will be at all times determined by the condition of the least significant output at terminal 90.

Row 18 includes respective segments 130 and 132 connected to slip rings 24 and 26 as indicated schematically by conductors 134 and 136. We provide this row 18 with only two switching segments 138 and 140 connected respectively to slip rings 20 and 22 by conductors 142 and 144. As is the case with the switching segments of row 16, the segments 138 and 140 of row 18 are located at points wherein the output of that row is to change from one condition to the other. Brush 32 produces an output signal which changes from one polarity to the other across an output resistor 146. The brush 34 provides an output signal across a resistor 148. We apply the signals on resistors 146 and 148 to flip-flop circuits 150 and 152 to provide the next-to-least and most significant outputs at terminals 154 and 156.

In operation of the form of our converter or encoder shown in FIGS. 1 and 2, as the body 10 moves relative to the brushes, there will be produced at the terminals 90, 154 and 156 a digital indication of the relative position of the body with respect to the brushes. By way of example, we have indicated eight relative positions from right to left as 0 to 7 at the top of FIG. 1. Assuming that the body 10 moves in the direction of the arrow A with respect to the brushes and that the body and brushes are at the beginning of the zero position, a positive potential is applied by brush 30 to flip-flop 76 with the result that output $A_0$ is at ground representing a binary 0. At the same time the circuit 106 places conductor 118 at a positive potential of about 20 volts and places conductor 124 at a negative potential of about 20 volts. Under these conditions switching segments 102 are at a positive 20-volt potential causing the output $A_1$ of flip-flop 150 to be at ground indicating a binary 0. Similarly, segment 138 of row 18 carries a positive 20-volt potential placing terminal 56 at ground indicating that the $A_2$ output is a binary 0. Now, as the body 10 moves relative to the brushes at about the midpoint of the zero position, brushes 32 and 34 move from the switching segments to segments 102 and 132 carrying positive potentials with the result that the outputs at terminals 154 and 156 do not change.

Upon further relative movement, brush 28 engages a segment 44 carrying a negative potential to drive the output $A_0$ to a positive potential of about 20 volts indicating a binary 1. This output causes the potentials on conductors 118 and 124 to switch polarity so that segments 100 and 140 now are positive. At about the midpoint in the one position, brush 132 rides onto a segment 100 carrying a positive potential so that the corresponding output does not change. Since at this time brush 34 remains on a positive segment 132 neither will the output at terminal 156 change. As the brushes 28 and 30 move into the "two" relative position, a positive potential is applied to flip-flop 76 to cause the outputs on conductors 118 and 124 to switch with the result that the polarity of the segment 100 on which brush 32 is riding changes from positive to negative at precisely the instant when the input of flip-flop 76 changes. Thus, the output $A_1$ at terminal 154 will be caused to change from a binary 0 to a binary 1 at precisely the same time as the least significant output $A_0$ changes from 1 to 0. In this way the outputs of greater significance are synchronized with the least significant output.

The remainder of the operations of the form of our invention shown in FIG. 1 can be followed through in this manner. Simply stated, the switching segments 100, 102, 138 and 140 are caused to change polarity in response to change in the condition of the least significant output. They are so located as to switch their corresponding outputs when they change polarity as the associated brush crosses the midpoint of the segment.

By way of simplification in order to avoid a prolix description of the operation of the device, there is outlined below Table I indicating the conditions of various circuit points as the body 10 moves relative to the brushes.

TABLE I

| Position | Row 12 | $A_0$ | X | Y | $A_1$ | $A_2$ |
|---|---|---|---|---|---|---|
| 0 | + | 0 | + | − | 0 | 0 |
| 1 | − | 1 | − | + | 0 | 0 |
| 2 | + | 0 | + | − | 1 | 0 |
| 3 | − | 1 | − | + | 1 | 0 |
| 4 | + | 0 | + | − | 0 | 1 |
| 5 | − | 1 | − | + | 0 | 1 |
| 6 | + | 0 | + | − | 1 | 1 |
| 7 | − | 1 | − | + | 1 | 1 |

In FIG. 1 for purposes of simplicity, we have indicated those segments to which a negative potential is applied by switch 60 in the condition by minus signs in parenthesis. We have shown segments to which a positive potential is applied by plus signs. Slip ring 20 and the segments connected thereto are designated by the letter X. Slip ring 22 and the segments connected thereto are designated by the letter Y.

A significant feature of our bipolar encoder is the fact that we can change the direction of the count without changing the direction of movement of the body 10 merely by reversing the application of potentials by switch 60. We have indicated the resultant count by arabic numerals in parenthesis at the top of FIG. 1. In certain instances it may be desirable to generate complementary outputs to the outputs $A_0$, $A_1$ and $A_2$. This may readily be achieved by placing another brush in the corresponding segment row at a position where the mechanical difference between the bit and complement brushes is equal to one half the period of that digit. Alternatively, separate complementary generating tracks could be used. In addition, while we have shown the outputs as varying between a positive potential and ground, we could provide a negative readout or we might even employ the opposite polarity signals generated by a circuit, such as driver 106, to represent a bit and its complement. In that event it would be necessary to provide a separate driver for each place of significance.

In the form of our invention shown in FIG. 1 each of the switching segments of every row has a width which is approximately the same as that of a segment in one of the least significant rows. As is known in the art, very often the rows of segments are in the form of concentric circles on a rotating disc. In such an arrangement where a large number of places are provided on a single disc, segments of the inner row may become exceedingly small. Our arrangement may be modified, as indicated in FIG. 3, to permit the use of relatively larger switching segments for the inner rows.

Figure 3:
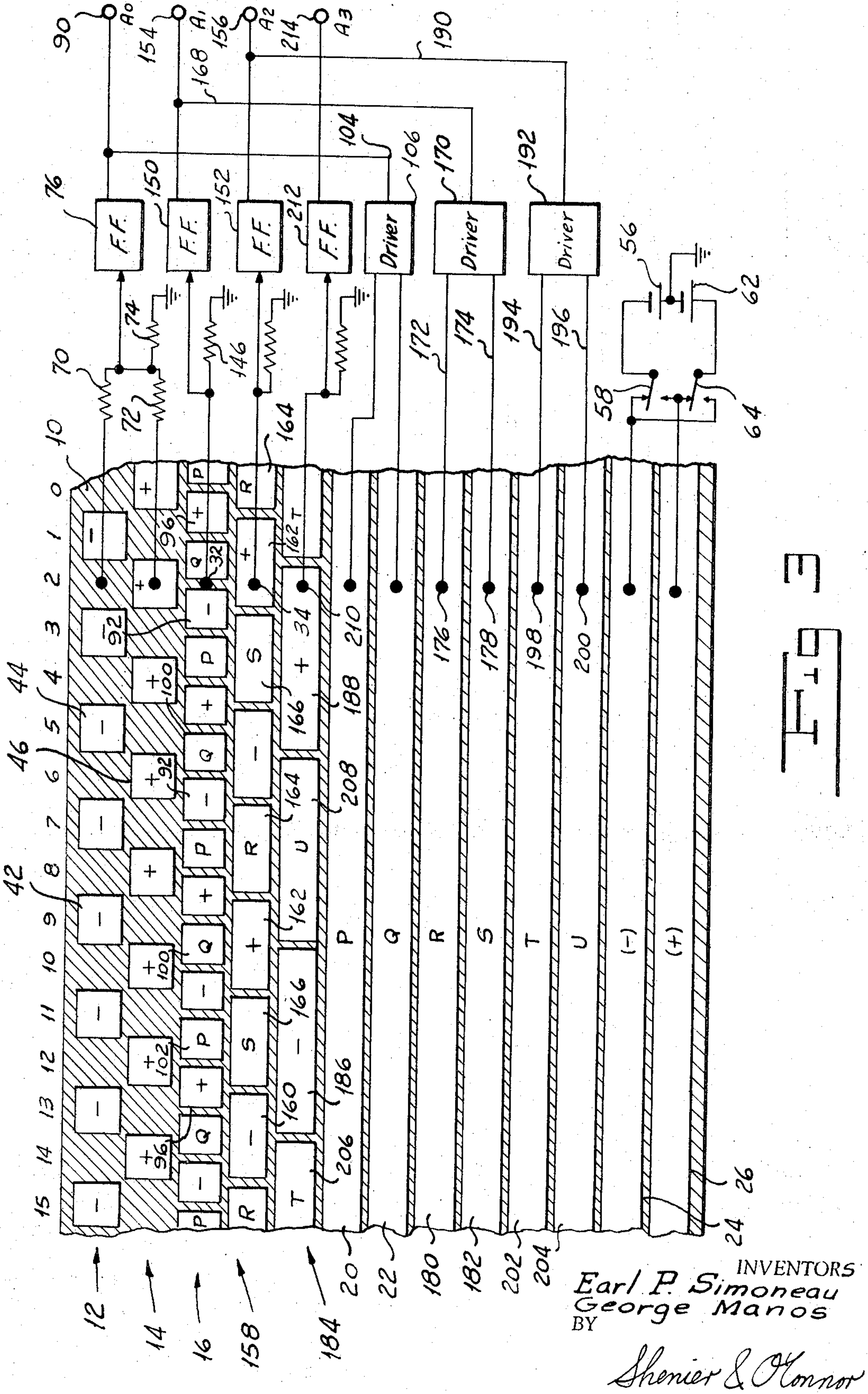
FIG. 3 is a schematic view of another form of our bipolar encoder.

Referring now to FIG. 3, we have illustrated a form of our encoder which can generate 16 counts, for example, from 0 to 15. In that form of our invention rows 12, 14 and 16 are substantially the same as are the same rows in the form of our invention shown in FIG. 1. Moreover, slip rings 20, 22, 24 and 26 and the associated circuitry are the same. Rather than designating the switching segments 102 and 100 by the letters X and Y, we have indicated them as P and Q in FIG. 3. In the form of our invention shown in FIG. 3, we provide a row indicated generally by the reference character 158 in the next place of greater significance to row 16. Row 158 includes segments 160 which are connected to slip ring 24 and segments 162 which are connected to slip ring 26. Between every other pair of adjacent segments 160 and 162 we insert switching segments 164. Other switching segments 166 are interposed between the segments of other pairs of adjacent segments 160 and 162. Rather than controlling the polarity of the switching segments 164 and 166 designated by letters R and S, from the least significant output $A_0$ we control the polarity of these segments from the next-to-least significant output $A_1$ at terminal 154.

A conductor 168 applies the output of flip-flop 150 to a driver circuit 170 similar to circuit 106 to cause circuit 170 to provide outputs of different polarities on conductors 172 and 174. The polarities of the outputs on these conductors are determined by the condition of the output of circuit 150. Respective brushes 176 and 178 apply the potentials on conductors 172 and 174 to respective slip rings 180 and 182 to which segments 164 and segments 166 are respectively connected. Owing to the fact that we thus control the polarities of segments 164 and 166 from an output of greater significance than the least significant, we are able to make each segment 164 and 166 approximately twice the width of a segment 100 or 102. The brush 34 associated with row 158 drives circuit 152 in a manner analogous to the operation of FIG. 1 to provide output $A_2$ at terminal 156.

In the form of our encoder shown in FIG. 3 we carry the procedure just described one step further. We provide a most significant row, indicated generally by the reference character 184, having a segment 186 connected to slip ring 24 and having a segment 188 connected to slip ring 26. A conductor 190 applies the output from circuit 152 to another driver circuit 192 similar to circuits 106 and 170 for producing output signals of opposite polarities on conductors 194 and 196. The polarities of the signals on conductors 194 and 196 switch in response to a change in condition of the output $A_2$. Brushes 198 and 200 apply these signals respectively to slip rings 202 and 204. We provide row 184 with a first switching segment 206 connected to slip ring 202 and with a second switching segment 208 connected to slip ring 204. It will readily be seen that the segments 206 and 208 are substantitlly twice the extent of a segment 160. A brush 210 associated with row 184 drives a flip-flop 212 to provide the most significant output $A_3$ at a terminal 214.

The operation of the form of our encoder of FIG. 3 is substantially the same as that of the encoder of FIG. 1.

Table II below outlines the conditions at various points in the encoder of FIG. 3 in response to relative movement between the body 10 and the brushes. This form of our encoder is a somewhat more advantageous form when constructed in the form of a disc carrying concentric circles of segments.

TABLF II

| Position | Row | $A_0$ | P | Q | R | S | T | U | $A_1$ | $A_2$ | $A_3$ |
|---|---|---|---|---|---|---|---|---|---|---|---|
| 0 | + | 0 | + | − | + | − | + | − | 0 | 0 | 0 |
| 1 | − | 1 | − | + | + | − | + | − | 0 | 0 | 0 |
| 2 | + | 0 | + | − | − | + | + | − | 1 | 0 | 0 |
| 3 | − | 1 | − | + | − | + | + | − | 1 | 0 | 0 |
| 4 | + | 0 | + | − | + | − | − | + | 0 | 1 | 0 |
| 5 | − | 1 | − | + | + | − | − | + | 0 | 1 | 0 |
| 6 | + | 0 | + | − | − | + | − | + | 1 | 1 | 0 |
| 7 | − | 1 | − | + | − | + | − | + | 1 | 1 | 0 |
| 8 | + | 0 | + | − | + | − | + | − | 0 | 0 | 1 |
| 9 | − | 1 | − | + | + | − | + | + | 0 | 0 | 1 |
| 10 | + | 0 | + | − | − | + | + | − | 1 | 0 | 1 |
| 11 | − | 1 | − | + | − | + | + | − | 1 | 0 | 1 |
| 12 | + | 0 | + | − | + | − | − | + | 0 | 1 | 1 |
| 13 | − | 1 | − | + | + | − | − | + | 0 | 1 | 1 |
| 14 | + | 0 | + | − | − | + | − | + | 0 | 1 | 1 |
| 15 | − | 1 | − | + | − | + | − | + | 0 | 1 | 1 |

While we have shown and described our encoder as generating a natural binary output, it will readily be appreciated that we can apply the principle of our encoder to a device utilizing binary coded decimal or Gray code or any other binary code. It may be used employing a rotating or stationary code disc or on a drum type encoder. A digit complement may be generated in the manner indicated above if necessary or desirable. We can reverse the direction of counting merely by reversing the application of signals to the various segments. It is possible also with the form of encoder we have shown to hold the output in one state indefinitely by switching off all inputs except the output circuit power. This permits the output to be read and held though the input shaft continues to rotate. Our encoder has a low output impedance in both the binary 0 and the binary 1 states ensuring a minimum noise pickup on data lines.

Brushes 32, 34, and 210 of FIGS. 1 and 3 preferably comprise a plurality of staggered wipers. This will permit each brush to bridge across the insulating gaps between adjacent segments of tracks 16, 18, 158, and 184. Flip-flops 150, 152, and 212 will continually receive either positive or negative input signals from these brushes. The provision of these staggered wipers is necessary to eliminate ambiguities if the encoders are stationary in the positions shown and the power supply for flip-flop 150 is initially turned on or is restored after momentary interruption. In FIG. 1, brush 32 will receive positive signals from positive segment 96 and Y segment 100 to insure that flip-flop 150 is properly driven. In FIG. 3, brush 32 will receive negative signals from negative segment 92 and Q segment 100 to insure that flip-flop 150 is properly driven when its power supply is initially turned on or is restored after momentary interruption.

It will be seen that we have accomplished the objects of our invention. We have provided an encoder which substantially eliminates the effect of noise on the encoder output. Our device has a substantially longer life than do contact encoders of the prior art. It is a bipolar encoder which does not require the use of an inordinate amount of auxiliary circuitry. It can be made in substantially the same size as an encoder of equivalent resolution in the prior art.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. In a bipolar analogue-to-digital converter for producing an output representation having a number of places of significance, means including a bistable electrical two-output-state device for producing an output which is positive with respect to a reference potential in response to a first driving potential having a magnitude greater than zero and for producing an output which is negative with respect to said reference potential in response to a second driving potential having a magnitude greater than zero, the output state of said device in the absence of any driving potential remaining the same as that in which said device has been placed by a driving potential, said means corresponding to a certain one of said places of significance, a conductive element in a place of greater significance than that of said certain place, means responsive to the output of said two-state device for switching said element between two different potentials, and a brush for deriving an output from said element.

2. In a bipolar analogue-to-digital converter as in claim 1 in which said first and second driving potentials are respectively a positive potential and a negative potential.

3. In a bipolar analogue-to-digital converter as in claim 1 in which said output-producing means comprises a pair of second conductive elements, means for applying said first driving potential to one element of said pair, means for applying said second driving potential to the other element of said pair, brush means adapted alternately to contact the segments of said pair, means mounting said brush means for movement with relation to said second conductive elements and means connecting said brush means to said device.

4. In a bipolar analogue-to-digital converter as in claim 1 in which said output responsive means comprises a slip ring connected to said element and a brush contacting said slip ring.

5. In a bipolar analogue-to-digital converter for producing an output representation having a number of places of significance, means including a bistable electrical two-state device for producing an output which is positive with respect to a reference potential in response to a first driving potential and which is negative with respect to said reference potential in response to a second driving potential, the state of said device remaining the same in the absence of a driving potential, said means corresponding to a certain one of said places of significance, a row of conductive elements in a place of greater significance than said certain one, said elements of said row comprising principal elements and auxiliary elements, said auxiliary elements being disposed respectively between the elements of pairs of adjacent principal elements, means for applying said first driving potential to alternate ones of said principal elements, means for applying said second driving potential to the other principal elements and means responsive to the output of said two-state device for switching said auxiliary elements between said first and second potentials.

6. In a converter as in claim 5 in which said signal generating means comprises a first row of elements having edges, said auxiliary elements being disposed with their centers aligned with edges of elements of said first row.

7. In a converter as in claim 5 including another row of elements comprising principal elements and auxiliary elements, said auxiliary elements of the other row being disposed respectively between the elements of pairs of adjacent principal elements of the other row, means for applying said first potential to alternate principal elements of the other row, means for applying said second potential to the other principal elements of the other row, and means responsive to the output of said device for switching said auxiliary elements of the other row between said first and second potentials.

8. In a converter as in claim 5 in which said row of conductive elements corresponds to the next-to-least significant place of said representation, said converter including a further row of conductive elements comprising principal elements and auxiliary elements, said auxiliary elements of the further row being disposed respectively between principal elements of said further row, means for applying said second potential to the remaining principal elements of said further row, means for applying said second potential to the remaining principal elements of the further row, second means comprising a second bistable electrical two-state device for producing an output in response to said driving potentials, brush means for contacting the elements of said next-to-least significant row, means connecting said brush means to said second means, and means responsive to the output of said second two-state device for switching said auxiliary elements between said first and second potentials.

9. An analogue-to-digital converter for producing a representation in a number of places of significance of the relative position of relatively movable members including in combination, first and second members mounted for relative movement, a body of insulating material carried by one of said members, means including said body and a bistable electrical two-state device for producing an output of one polarity in response to a driving potential of a first polarity and for producing an output of the opposite polarity in response to a driving potential of a second polarity, the state of said device remaining the same in the absence of a driving potential, said means corresponding to the representation place of least significance, a plurality of rows of conductive elements carried by said body, said elements being relatively insulated at a surface of said body, said rows corresponding respectively to places of significance greater than said least significant place, each of said rows comprising principal elements and respective auxiliary elements each disposed between elements of a pair of adjacent principal elements, means for applying a positive potential to alternate principal elements of each of said rows, means for applying a negative potential to the remaining principal elements of each of said rows, and means responsive to said output for switching the auxiliary elements of said rows between said positive and said negative potentials.

10. An analogue-to-digital converter as in claim 9 in which said means for applying said positive and negative potentials to said principal elements comprise a reversing switch.

11. A converter as in claim 9 in which said switching means comprises a first slip ring and a second slip ring on said body, means connecting the first slip ring to alternate auxiliary elements of each row and means connecting the other slip ring to the remaining auxiliary elements of each row.

12. A converter as in claim 9 in which said means responsive to said output comprises a first slip ring, means connecting the first slip ring to alternate auxiliary elements of one of said rows, a second slip ring, means connecting the second slip ring to the other auxiliary elements of said one row, means comprising a second bistable electrical two-state device for producing an output which is respectively of one polarity and of the opposite polarity in response to a driving potential of a first polarity and of a second polarity for deriving a second output from the segments of said one row, a third slip ring, means connecting the third slip ring to alternate auxiliary segments of another row, a fourth slip ring, means connecting said fourth slip ring to the remaining auxilitry segments of said other row and means including said third and fourth slip rings and responsive to said second output for switching the auxiliary segments of the other row between said positive and negative potentials.

13. A converter as in claim 9 in which said siwtching means comprises a first slip ring and a second slip ring on said body, means connecting said first slip ring to alternate auxiliary elements of each row, means connecting the other slip ring to the remaining auxiliary elements of each row, means for producing first and second switching signals, said first switching signal changing from said positive potential to said negative potential as said output changes from its first state to its second state, potential to said positive potential as said output changes from its first state to is second state, means for applying said first switching signal to said first slip ring and means for applying said second switching signal to said second slip ring.

14. A converter as in claim 9 in which said means responsive to said output comprises a first slip ring, means connecting said first slip ring to alternate auxiliary elements of one of said rows, a second slip ring, means connecting the second slip ring to the other auxiliary elements of said one row, means for producing first and second switching signals, said first switching signal changing from said positive potential to said negative potential as said first output changes from one of its states to the other, said second switching signal changing from said negative potential to said positive potential as said first output changes from said one state to the other, means for applying said first switching signal to said first slip ring and means for applying said second switching signal to said second slip ring, said converter including means comprising a second bistable electrical two-state device for producing an output which is respectively of one polarity and to the opposite polarity in response to a driving potential of a first polarity and of a second polarity for deriving a second output from the segments of said one row, a third slip ring, means connecting the third slip ring to alternate auxiliary segments of another row, a fourth slip ring, means connecting said fourth slip ring to the remaining auxiliary segments of said other row, means responsive to said second output for producing third and fourth switching signals, said third switching signal changing from said positive potential to said negative potential when said second output changes from one of its states to the other, said fourth switching signal changing from said negative potential to said positive potential when said second output changes from said one state to the other, means for applying said third switching signal to said third slip ring and means for applying said fourth switching signal to the fourth slip ring.

15. An analogue-to-digital converter for producing an indication of the relative position of relatively movable members including in combination, a body of insulating material carried by one of said members, a first group of conductive elements carried by said body, said first group corresponding to the least significant place in said indication, a plurality of other groups of conductive elements carried by said body, said other groups corresponding respectively to places of greater significance in said indication, each of said other groups comprising principal elements and auxiliary elements disposed respectively between the principle elements of pairs of adjacent principal elements, means providing a first potential and a second potential different from the first, means for applying said first potential to alternate elements of said first group and to alternate principal elements of each of said other groups, means for applying said second potential to the remaining elements of said first group and to the remaining principal elements of each of said other groups, brush means adapted to contact the elements of said first group, means mounting said brushing means on the other member alternately to contact one of said first group alternate elements and one of said first group remaining elements to provide a first switching signal alternating between said first potential and said second potential and a second switching signal alternating between said second potential and said first potential as said members move relative to each other and means responsive to said switching signals for controlling the potentials of said auxiliary elements of said other groups.

16. A converter as in claim 15 in which said groups of elements are arranged in rows, each of said auxiliary elements being disposed symmetrically about a line passing along the edge of an element of the first group.

17. A converter as in claim 15 in which each of said auxiliary elements has an extent along the path of said relative movement approximately equal to the extent of a first group element along said path.

18. A converter as in claim 15 in which an auxiliary element of one of said other groups of greater significance has an extent along the path of said relative movement approximately twice the extent of a first group element along said path.

19. A converter as in claim 15 in which said means for applying said potentials to said first group elements and said principal elements comprise first and second slip rings carried by said body, electrical connections on said body between said first slip ring and said first group alternate elements and said principal alternate elements and electrical connections on said body between said second slip ring and said first group remaining elements and said principal remaining elements.

20. An analogue-to-digital converter as in claim 15 in which said means for applying said potentials to said first group alternate elements and said principal alternate elements comprise first and second slip rings carried by said body, electrical connection on said body between said first slip ring and said first group alternate elements and said principal alternate elements, electrical connections on said body between said second slip ring and said first group remaining elements and said principal remaining elements, brushes respectively engaging said first and second slip rings and a reversing switch between said brushes and said potential applying means.

21. A converter as in claim 15 in which said means responsive to said switching signals comprises a first slip ring on said body, electrical connections on said body between said first slip ring and alternate ones of the auxiliary elements of each of the other groups, a second slip ring on said body, electrical connections on said body between said second slip ring and the ramaining auxiliary elements of said other groups and means coupling the switching signals respectively to the first and second slip rings.

22. A converter as in claim 15 in which said means responsive to said switching signal comprises a first slip ring carried by said body, electrical connections on said body between said first slip ring and alternate auxiliary elements of the next-to-least significant group, a second slip ring carried by said body, electrical connections on said body between said second slip ring and the remaining auxiliary elements of said next-to-least significant group, means coupling the first and second switching signals respectively to the first and second slip rings, a brush adapted to contact the elements of said next-to-least significant group, means including said brush carried by said other member for deriving a third switching signal alternating between said first potential and said second potential and a fourth switching signal alternating between said second potential and said first potential, a third slip ring on said body, electrical connections on said body between said third slip ring and alternate auxiliary elements of a group of greater significance than said next-to-least group, a fourth slip ring on said body, electrical connections on said body between said fourth slip ring and remaining auxiliary elements of said group of greater significance than said next-to-least and means coupling the third and fourth switching signals respectively to said third and fourth slip rings.

23. A converter as in claim 15 including brushes adapted to contact the elements of said groups of greater significance respectively and means mounting said brushes on said other member to derive outputs.

24. An analogue-to-digital converter for providing an output indication in a plurality of places of significance of the relative position of relatively movable members including in combination, a body of insulating material on one of said members, a plurality of groups of conductive elements carried by said body, said groups corresponding to respective output places of significance, brush means carried by said other member for contacting the elements of the least significant group, means including said brush means for proving a bipolar signal in response to relative movement between said members, each of said groups of greater significance than the least including an auxiliary segment and means responsive to said bipolar signal for switching said auxiliary segments between a first potential having a magnitude greater than zero and a second potential different from the first having a magnitude greater than zero.

References Cited

UNITED STATES PATENTS

| | | | |
|---|---|---|---|
| 2,873,440 | 2/1959 | Speller | 340—347 |
| 3,020,533 | 2/1962 | Schaefer et al. | 340—347 |
| 3,070,787 | 12/1962 | Waldron et al. | 340—347 |
| 3,070,789 | 12/1962 | Kristy et al. | 340—347 |
| 3,156,911 | 11/1964 | Ziserman | 340—347 |
| 3,246,316 | 4/1966 | Saylor et al. | 340—347 |
| 3,286,251 | 11/1966 | Byun et al. | 340—347 |

MAYNARD R. WILBUR, Primary Examiner

G. R. EDWARDS, Asssistant Examiner

PO-1050
(5/69)

UNITED STATES PATENT OFFICE
CERTIFICATE OF CORRECTION

Patent No. 3,553,683 Dated January 5, 1971

Inventor(s) Earl P. Simoneau and George Manos

It is certified that error appears in the above-identified patent and that said Letters Patent are hereby corrected as shown below:

Column 9, line 7:
"second potential to the remaining" should be
-- first potential to alternate -- .

Column 9, line 71:
"siwtch-" should be -- switch- -- .

Column 10, line 4:
After "state," at end of line, insert
-- said second switching signal changing from
said negative -- .

Column 10, line 6:
"is" should be -- its -- .

Column 10, line 27:
"to" (first occurrence) should be -- of -- .

Column 10, line 64:
"brushing" should be -- brush -- .

Column 11, line 24:
"connection" should be -- connections -- .

Column 11, line 39:
"ramaining" should be -- remaining -- .

Signed and sealed this 13th day of April 1971.

(SEAL)
Attest:

EDWARD M.FLETCHER,JR.
Attesting Officer

WILLIAM E. SCHUYLER, J
Commissioner of Patent